United States Patent [19]
Otto

[11] 3,961,416
[45] June 8, 1976

[54] METHOD OF ASSEMBLING A DYANAMOELECTRIC MACHINE

[75] Inventor: Charles W. Otto, DeKalb, Ill.

[73] Assignee: General Electric Company, Fort Wayne, Ind.

[22] Filed: June 9, 1975

[21] Appl. No.: 585,148

Related U.S. Application Data

[60] Continuation of Ser. No. 495,941, Aug. 9, 1974, abandoned, which is a division of Ser. No. 397,693, Sept. 17, 1973, Pat. No. 3,844,024, which is a continuation-in-part of Ser. No. 246,219, April 21, 1972, abandoned.

[52] U.S. Cl. ............................. 29/596; 164/110; 164/111; 228/165; 228/185; 228/244; 228/257; 310/43
[51] Int. Cl.² ................................. H02K 15/16
[58] Field of Search ............... 29/596, 598; 310/42, 310/43, 89, 254, 258, 259; 164/108, 110, 111; 228/165, 173, 244, 257, 185

[56] References Cited
UNITED STATES PATENTS

| | | | |
|---|---|---|---|
| 598,540 | 2/1898 | Soames | 29/596 |
| 3,145,313 | 8/1964 | Tupper | 310/42 |
| 3,165,816 | 1/1965 | Thompson et al. | 29/596 |
| 3,313,967 | 4/1967 | Ross | 310/254 |
| 3,482,125 | 12/1969 | Fleckenstein | 310/42 |
| 3,705,994 | 12/1972 | Berry, Jr. | 310/91 |

OTHER PUBLICATIONS

"Joining Parts by Die Casting," by F. H. Jay, Machine Design, Apr. 15, 1971, pp. 93–95.

*Primary Examiner*—Carl E. Hall
*Attorney, Agent, or Firm*—Joseph E. Papin

[57] ABSTRACT

A method of assembling a dynamoelectric machine having a stationary member, a rotatable member, and a pair of means for rotatably supporting the rotatable member within the stationary member. In this method, beams are attached to the stationary member, and opposite end portions of the beams extend from the stationary member. The rotatable means is then mounted with the stationary member and the supporting means with one of the opposite end portions of the beams within means in one of the supporting means for receiving them. The receiving means is at least partially filled with molten metal which solidifies for interconnecting the one opposite end portion of the beams with the one supporting means, and the other of the supporting means is then secured to the other of the opposite end portions of the beams.

42 Claims, 14 Drawing Figures

METHOD OF ASSEMBLING A DYANAMOELECTRIC MACHINE

CROSS REFERENCE TO RELATED APPLICATIONS

This application is a continuation of copending application Ser. No. 495,941 filed Aug. 9, 1974 now abandoned, which is a divisional of application Ser. No. 397,693 filed Sept. 17, 1973 (now U.S. Pat. No. 3,844,024 issued Oct. 29, 1974) which is a continuation-in-part of original application Ser. No. 246,219 filed Apr. 21, 1972 (now abandoned), and the subject matter of the divisional application, the continuation-in-part application and the original application is specifically incorporated by reference into this application.

FIELD OF THE INVENTION

This invention relates generally to dynamoelectric machines and in particular to methods of assembling them.

BACKGROUND OF THE INVENTION

As well known in the art, dynamoelectric machines are provided with a rotatable member or assembly, generally referred to as a rotor, a stationary member, generally referred to as a stator, in which the rotatable member is received, and structural components, such as opposite end frames or shields, which are secured to the stationary member and rotatably support or journal the rotatable member.

In dynamoelectric machines of the type just described, it is most important that the rotor and stator be mounted or assembled during manufacture in proper radial and axial alignment, and that such be done expeditiously and inexpensively. Improper radial alignment results in undesirable eccentricity in an annular air gap between the rotor and magnetic core while improper axial alignment produces undesirable excessive axial rotor thrust. It is also important that the end frames be properly aligned with the stator and rotor to ensure longevity for the bearing means of the end frames.

In the past, several different methods of assembling dynamoelectric machines with the rotor thereof properly positioned within the stator and with the end frames properly mounted with respect to the stator and rotor having the bearing means thereof for supporting engagement with the rotor mutually aligned along a common axis. For example, stators have been connected to end frames by through-bolts; however, proper radial alignment here is achieved principally through close tolerance fits between the dynamoelectric components. With such methods, the tighter the tolerances are held, the more accurate the resulting alignment; however, one of the disadvantageous or undesirable features of such method is that close tolerances not only are costly to effect during manufacture but also impede assembly.

Another method of mounting components of a dynamoelectric machine was one in which an oversized dummy rotor was used to assemble and align the dynamoelectric machine components with an actual rotor being subsequently substituted after alignment between rotor and stator was achieved. Such use of dummy rotors, however, was limited to "unit bearing" type machines, that is dynamoelectric machines in which the rotor is supported at one end only. A disadvantageous or undesirable feature of this method was that it was unavailable for use with the great majority of dynamoelectric machines wherein the rotor is rotatably supported at both ends of its shaft in opposite end frames.

U.S. Pat. No. 3,165,816 disclosed a different approach to assembling dynamoelectric machines. Shims were arranged in the air gap between rotor and stator, and opposite end frames were disposed adjacent the end faces of the stator in journaling engagement with the rotor. The stator and end frames were then bonded together with an adhesive bonding material, such as a thermosetting resin or the like, thereby securing the stator and end frames together upon curing of the adhesive.

U.S. Pat. No. 3,705,994 disclosed a method by which the end portions of a set of beams attached to a stator of a dynamoelectric machine were welded to a pair of opposite end frames; however, one of the disadvantageous or undesirable features thereof was that the welds establish stresses upon cooling which tend to distort the preferred alignment of the dynamoelectric machine components, as is well known in the art.

SUMMARY OF THE INVENTION

A principle object of the present invention is to provide a method of assembling a dynamoelectric machine which overcomes the disadvantageous or undesirable features set forth hereinabove, as well as others, with respect to such past methods, and this, as well as other objects and advantageous features of the present invention, will in part be apparent and in part be pointed out in the specification which follows.

In general, a method in one form of the invention is provided for assembling a dynamoelectric machine having a stationary member, a rotatable member adapted to be received in the stationary member, and a pair of means for supporting the rotatable member within the stationary member. In this assembly method, a plurality of beams are attached to the stationary member and have opposite end portions extending from the stationary member. The rotatable member is mounted with the stationary member and the supporting means with at least one of the opposite end portions of the beams within means in at least one of the supporting means for receiving them. The receiving means is provided with a material, such as a molten metal in one exemplification of the invention, which is hardenable or solidifies for interconnecting the one opposite end portion of the beams with the one supporting means. Thereafter, the other of the supporting means is secured to the other of the opposite end portion of the beams.

More particularly and in one form of the invention, a method is provided for assembling a dynamoelectric machine. In this assembling method, a set of beams is mounted to a magnetic core with two spaced portions of each beam extending from opposite faces of the core, respectively, and a rotor is positioned within the bore of the magnetic core with a rotor shaft journaled through a bearing of a first bearing carrying end shield. The set of beam portions extending from one of the opposite faces of the core are positioned within a set of sockets in the first bearing carrying end shield with an air gap existing between the inner walls of the sockets and the extending beam portions residing therein. At least portions of the air gaps are filled with molten metal, and the molten metal then solidifies to form metallic plugs within the sockets in abutment with the socket inner walls and the extending beam portions residing therewithin. Thereafter, the set of beam portions extending from the other of the opposite faces of the core within a second set of sockets in a second bearing carrying end shield with air gaps existing between the inner walls of the second sockets and the extending beam portions residing therewithin and with the rotor shaft the bearing of the second bearing carrying end shield. At least portions of the air gaps within the second set of sockets are filled with molten metal and the molten metal is then solidified in the second set of sockets in abutment with the second set of socket inner walls and the extending beam portions residing therewithin.

Also in general and in one form of the invention, in assembling a dynamoelectric machine there is provided a method of mounting a bearing carrying end shield to a magnetic core. In this mounting method, a plurality of rigid beams is secured to the magnetic core with a portion of each beam extending from the magnetic core, and a rotor is positioned within the magnetic core with the rotor shaft journaled through the bearing carried by the bearing carrying end shield and with part of the extending portion of each beam positioned within a socket in the end shield. Molten metal is then introduced into the sockets and solidified therein.

Further in general, a method in one form of the invention is provided for assembling a dynamoelectric machine having at least a stationary member, a rotatable member, and a pair of means for rotatably supporting the rotatable member in the stationary member. In this assembling method, a plurality of beams having a pair of opposite end portions is connected to the stationary member. The rotatable member is then assembled with the stationary member and at least one of the supporting means with one of the opposite end portions of the beams disposed within a generally open end of means integrally formed in the at least one supporting means for accepting the one opposite end portions. A hardenable material, such as molten metal in one exemplification of the invention, is provided within the accepting means and freely flowed therein into interfacing relation with both the at least one supporting means and at least a part of the one end portions within the accepting means so as to form a generally solidifed rigid tie therebetween. The other supporting means is then secured to the other of the opposite end portions of the beams.

Also in general and in one form of the invention, in the manufacture of a dynamoelectric machine there is provide a method of assembling a structural component and a stationary member for the dynamoelectric machine. In this assembling method, there is involved attaching to the stationary member at least one generally elongate beam having an end portion extending from the stationary member. There then may be effected a step of disposing a rotatable member for the dynamoelectric machine in the stationary member and the structural component and positioning the end portion within means in the structural component for encompassing at least a part of the end portion. And the next step of the assembling method is providing in the encompassing means a hardenable material and freely flowing it therewithin into interfacing relation with both at least a part of the structural component and the at least part of the end portion for forming a generally solidified connection therebetween.

BRIEF DESCRIPTION OF THE DRAWINGS

Corresponding reference characters indicate corresponding parts throughout the several views of the drawings.

The following exemplifications set out herein illustrate the preferred embodiments of the invention and such exemplification are not to be construed as in any manner the scope of the invention limiting.

DESCRIPTION OF THE PREFERRED EMBODIMENT

Figures 1, 2, 3:
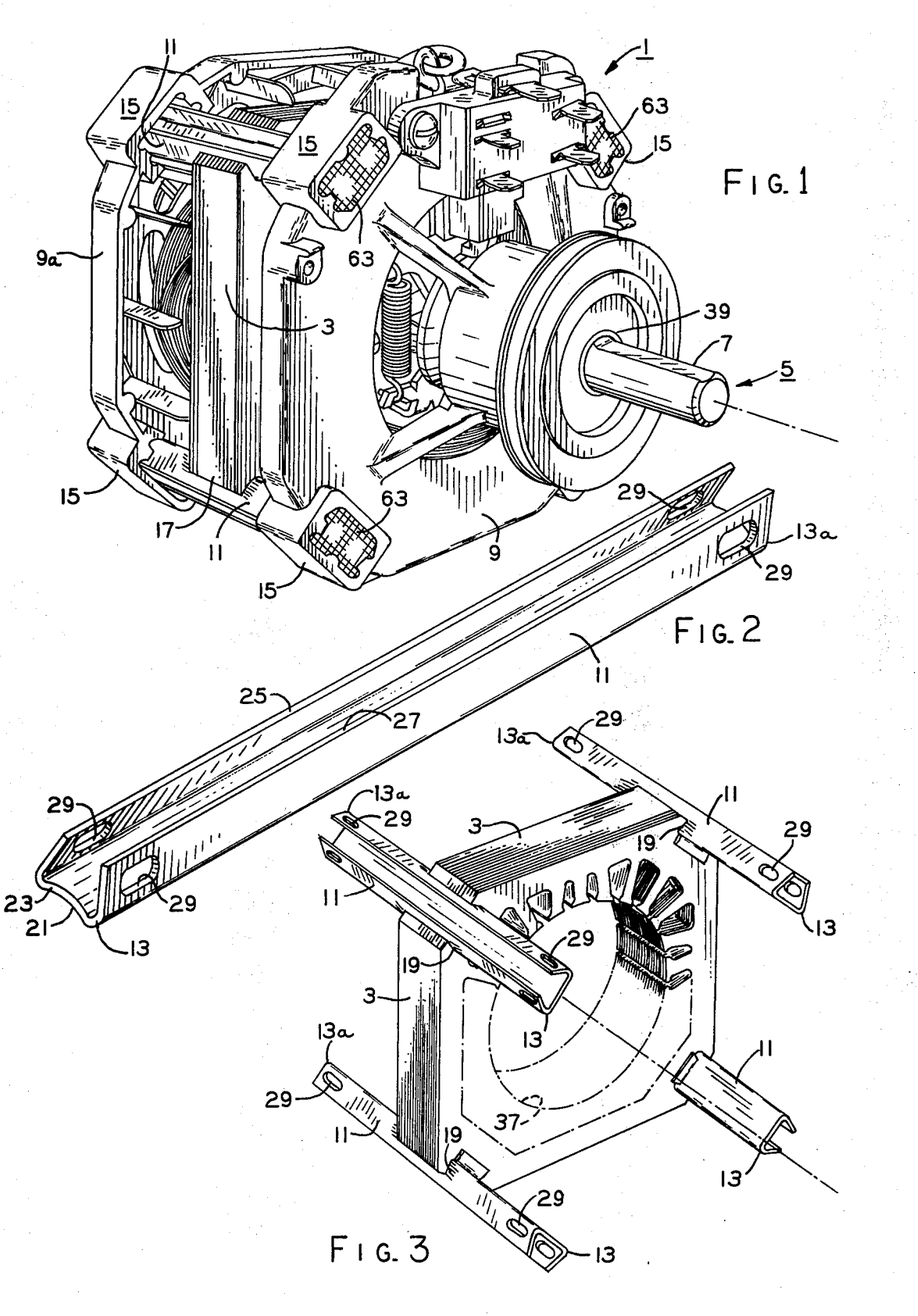
FIG. 1 is a perspective view of a dynamoelectric machine having a stationary member, a rotatable member, and supporting means therefor assembled together by utilization of principles of methods respectively in one form of the present invention.
FIG. 2 is a perspective view of a beam of the stationary member shown in FIG. 1.
FIG. 3 is a perspective view of a plurality of beams of FIG. 2 assembled to the stationary member of the dynamoelectric machine shown in FIG. 1.

Referring now to the drawings in general, there is illustrated in one form of the invention a method of assembling a dynamoelectric machine, such as an electric motor 1 (FIG. 1). Motor 1 has a stationary member, such as a stator or magnetic core 3, and a rotatable member 5, generally constituted by a rotor (not shown) mounted to a shaft 7 in a manner well known in the art, is adapted to be rotatably received in the stator. A pair of means, such as structural components or end frames or shields 9, 9a, are provided for rotatably supporting rotatable member 5 within stator 3. In this method, a plurality or set of generally rigid elongate members, such as generally U-shaped beams 11, are attached or mounted to stator 3 and respectively having a pair of opposite end portions 13, 13a extending from the stator (FIG. 2). Rotatable member 5 is then mounted or assembled with stator 3 and supporting means or end frames 9, 9a with at least one of the opposite end portions 13 of beams 11 within means, such as a plurality sockets 15, in at least one end frame 9 for accepting, encompassing or receiving them (FIGS. 4–8). Receiving encompassing or accepting means, such as sockets 15, are then provided with a hardenable material, such as for instance in one exemplification of the invention a molten metal M, and the molten metal is freely flowed in the socket into interfacing relation with both the one opposite end portion 13 of beams 11 and the one end frame 9 so as to form a solidified or rigid connection or tie therebetween. Thereafter, the other of the supporting means or end frame 9a may be secured to the other of the opposite end portions 13a of beams 11 (FIG. 1).

More particularly and with reference to FIGS. 2 and 3, stator 3 is provided with an outer peripheral surface 17 having a plurality of means, such as grooves 19 therein, for retaining engagement with beams 11. Beam 11 are respectively positioned in grooves 19 with opposite end portions 13, 13a of the beams projecting from each of the opposite faces of stator 3 and with portions intermediate the projecting end portions received or disposed within the grooves.

Figure 9:
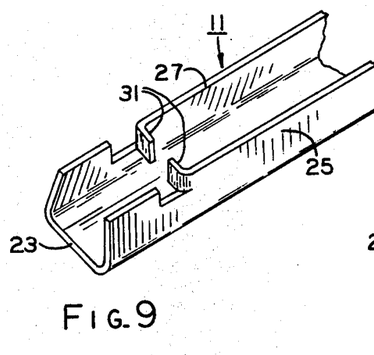
FIGS. 9, 10 and 11 are perspective views of an end portion of the beams illustrating alternate means thereon for gripping or displacement preventing engagement with the solidified metal in the receiving means of the structural component.

Beams 11 are then rigidly secured, attached or mounted to stator 3 by suitable means well known in the art, such as staking, press-fitting or the like, and such mounting of the beams is preferably accomplished by flattening a pre-crimped wedge or raised ridge or rib portion 21 generally centrally provided in a base 23 of the beam thereby to separate a pair of opposite elongate sides or flange portions 25, 27 integrally formed with the base wall. In this manner, intermediate portions of sides 25, 27 generally centrally of beams 11 are urged or moved into displacement preventing engagement with the generally complementary shaped and confronting opposite side walls of grooves 13. For a more detailed explanation of the attaching of beams 11 to stator 5, reference may be had to U.S. Pat. No. 3,807,040 issued Apr. 30, 1974. While beams 11 and their attachment of stator 3 are shown and discussed herein for purposes of disclosure, it is contemplated that other types of beams having other shapes or configurations and other methods or types of attachments of such other types of beams to a stator may be utilized within the scope of the invention so as to generally conform with the objects and the advantageous features thereof. Means, such as an opening or aperture 29 is provided through at least one of beam sides 25, 27 adjacent end portions 13, 13a of beams 11 for gripping or displacement preventing engagement with metal M introduced into sockets 15, as discussed in greater detail hereinafter. Of course, other such gripping means are also contemplated as being within the scope of the invention, and alternative gripping means are also illustrated for purposes of disclosure in FIGS. 9-11. In FIG. 9, gripping means, such as wings or tabs 31 are lanced or slit in beam sides 25, 27 and bent inwardly therefrom into the beam channel, and in FIG. 10, other wings or tabs 33 are also lanced or slit in the beam sides and bent downwardly therefrom into the beam channel. Of course it is apparent that only one tab may be formed in one of beam side walls 25, 27 and bent therefrom within the scope of the invention. In FIG. 11, a tab 35 is lanced or slit in the base 23 of beam 11 and bent upwardly therefrom into the channel of the beam. While tabs 31, 33 and 35 of FIGS. 9-11, respectively, are all shown bent into the channel of beam 11, it may be noted that the tabs could also be bent away from the channel of the beam providing, of course, that the tabs may be accommodated within sockets 15 of end frame 9. Referring back to FIGS. 1 and 2, stator 3 is provided with a bore 37 in which the rotor (not shown) mounted on shaft 7, as previously mentioned, is adapted to be received, and the rotatable member 5, i.e. shaft 7 thereof, is rotatably supported or journaled in end frame 9, 9a.

Figure 4:
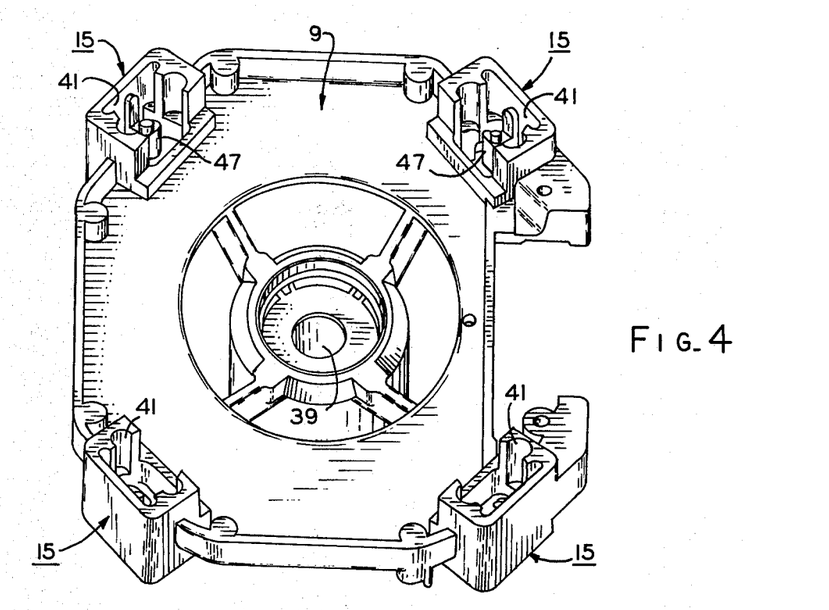
FIG. 4 is a perspective view of a supporting means of the dynamoelectric machine shown in FIG. 1.
Figure 6:
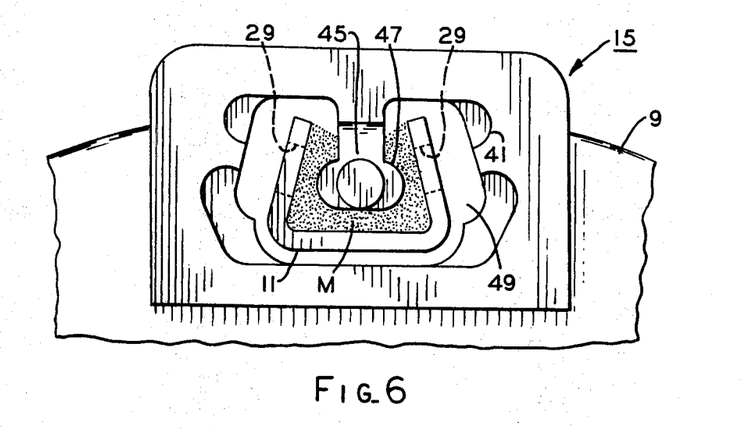
FIGS. 6, 7 and 8 are sequential views of FIG. 5 and illustrating the filling of the receiving means taken along line 6—6 by the molten metal but with the flow chute removed for clarity.
Figure 7:
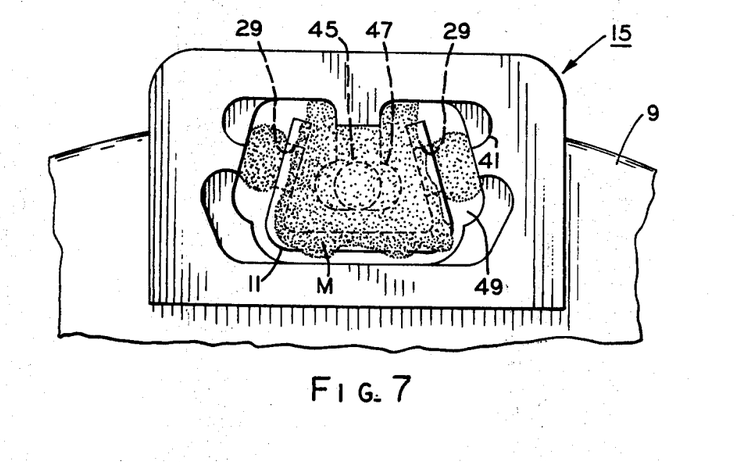
Figure 8:
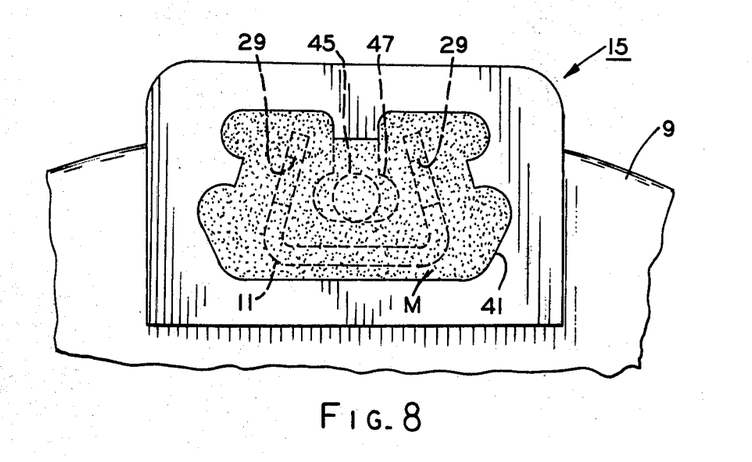

End frame 9, as also shown in FIG. 4, is preferably composed of an aluminum alloy, such as that known commercially as A-380 or the like, but is contemplated that the end plate may be made from other materials; however, irrespective of the material of which the end frame is made, it must have a melting point in excess of that of molten metal M, as discussed hereinafter. Means, such as a sleeve bearing 39, or the like is centrally provided in end frames 9, 9a for bearing or journaling or rotatably supporting engagement with shaft 7. Sockets 15 are provided in end frames 9, 9a extending therethrough adjacent their outer peripheral portions, but for purposes of brevity only the sockets of end frame 9 are shown in detail and described hereinafter. As also shown in FIG. 6, sockets 15 are generally defined by side walls or portions 41 which are integrally formed with end frame 9 extending generally axially thereof, and the socket side walls are predeterminately shaped so as to provide integrally formed portions or means, such as studs 45, for griping engagement with metal M disposed in the sockets. Studs 45 extend from side walls 41 so as to generally bifurcate at least a part of sockets 15, and heads or cross-members 47 are integrally provided on the studs adjacent the distal or free ends thereof within the sockets for gripping engagement with metal M, as shown in FIGS. 6-8 and described hereinafter. Socket side walls 41 studs 45 thereof define passages 49 which extend through sockets 15, between the opposite ends thereof, and the shape of the passages is preferably generally complementary to that of end portions 13 of beams 11 which are adapted to be received therein; however, it is contemplated as being within the scope of the invention to provide passages through the sockets having shapes other than generally complementary to those of the beams. For instance, in FIGS. 12 and 13, there is shown an alternative beam receiving means, such as a socket 51, having gripping means, such as flange 53 or the like, integrally formed with and extending from side wall 41 of the socket, and while flange 53 is shown continuously formed about passage 49, it is also contemplated that the flange could be interrupted, i.e. in the form of one or more smaller flanges. It is also contemplated that the sockets of end frames 9, 9a may be closed at one end thereof, and such an alternative socket 55 is shown in FIG. 14. Socket 55 is substantially the same as socket 15 except an end wall 57 is integrally formed with side walls 41 thereby to form a cup or the like for holding metal M, as discussed hereinafter.

Figure 5:
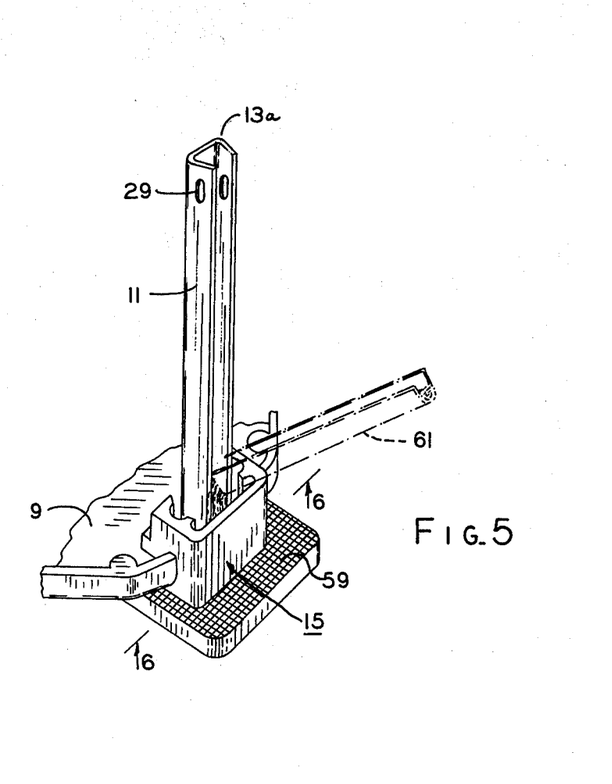
FIG. 5 is a fragmentary perspective view of the supporting means shown in FIG. 4 with a portion of one of the beams shown in FIG. 3 positioned in means for receiving them provided in the supporting means and with molten metal being poured into the receiving means to secure the beam and the supporting means together.

Referring now to FIGS. 5-8, end frame 9 is placed on a fixture (not shown) having asbestos pads 59 urged by springs or other resilient means or the like (not shown) against the end frame about the bottom or end of sockets 15, as shown in FIG. 5. Rotatable assembly 5 may be mounted on or assembled to end frame 9 in a predetermined position, and stator 3 may placed on the fixture above end frame 9 with its bore 37 predeterminately disposed about the rotatable assembly and with each of projecting end portions 13 of beams 11 received or positioned within mating sockets 15. Each beam 11 is inserted into its mating socket 15 to terminate short of the surface of asbestos pads 59 and preferably without contact being made therewith or with side walls 41 of the socket or socket studs 45. Confronting apertures 29 of beam end portions 13 are thereby positioned about opposite sides of socket studs 45, and in this position, an air gap G exists between the beam end portions within the sockets and with side walls 41, studs 45 and asbestos pads 59.

Next, metal M, such as aluminum, lead, zinc or alloys thereof, zinc alloy, preferably Zamak No. 3 currently offered for sale by the New Jersey Zinc Company of Goucester City, N. J., which carries the ASTM designation of B240, alloy AG40A, is melted and introduced or poured from a ceramic ladle or chute 61, as shown in phantom lines in FIG. 5, into the channel portions of beams 11 which provide a passage therefor just above the top of sockets 15. As seen in FIG. 6, molten metal M flows downwardly within the channel or U-shaped section of beams 11 towards asbestos pads 59. As molten metal M reaches the bottom of socket 15, it spreads or flows freely laterally through beam apertures 29 and out from under end portions 13 of beams 11, as shown in FIG. 7. Molten metal M then flows into contact or interfacing relation with side walls 41 of sockets 15 and socket studs 45 completely enveloping the studs, and within a predetermined period of time, the molten metal cools and solidifies within the sockets thereby to form means, such as plugs 63 of hardenable material or molten metal M, for mounting, holding or interconnecting engagement between end frame 9 and beams 11. It may be noted that forming plugs 63 about socket studs 45 and beam apertures 27 in effect establishes interlocks or rigid ties therebetween which obviates relative displacement movement of end frame 9 and beams 11 from their assembly positions. As solidification of molten metal M occurs, the metal shrinks about studs 45 and the cross-members 47 thereof into tight gripping or shrinking engagement therewith; therefore, the inherent shrinking characteristics of solidifying metal is utilized to secure plugs 63 in gripping or mounting engagement with end frame 9. It may also be noted that the soldification of metal M within apertures 29 of beams 11, in effect, forms bars which prevents vertical displacement movement of the beams relative to end frame 9 and secures plugs 63 in gripping or mounting engagement with the beams. In this manner, plugs 63 establish a rigid connection in mounting engagement between end portions 13 of beams 11 and at least a portion; i.e. studs 45, of socket 15. While hardenable material, such as metal M in one exemplification of the invention, has been shown and discussed herein as being poured or cast into sockets 15, it is contemplated that such hardenable material may be provided in the sockets and freely flowed thereon by other suitable means or methods within the scope of the invention so as to generally conform with the objects and advantageous features thereof.

The other end frame 9a may now be interconnected with the other opposite end portions 13a of beams 11 generally in the same manner as described hereinabove with respect to end portions 13 and end frame 9, but it is contemplated that end frame 9a may be secured or attached to the other opposite end portions 13a of the beams by other suitable means or methods well known to the art within the scope of the invention so as to generally conform with the obejcts and advantageuos features thereof, if desired. For greater detail with respect to the positing of beams 11 with respect to sockets 15 of end frames 9, 9a and also with respect to the casting of metal M reference is made to copending applicataion Ser. No. 397,425 filed Sept. 14, 1973 and to copending application Ser. No. 401,177 filed Sept. 29, 1973, now abandoned and refiled as Ser. No. 539,038 on Jan. 1, 1975.

The assembly of stator 3 to end frames 9, 9a by the use of hardened or solidified material, such as metal M in one form of the invention, within end shield sockets 15 in which opposite end portions 13, 13a of beams 11 are disposed offers numerous advantages over prior art assembly methods for dynamoelectric machines, such as those previously described. Radial alignment between stator 3 and the rotor is performed by actually journaling rotor shaft 7 through bearings 39 formed in or carried by end frames 9, 9a as discussed in detail in copending application Ser. No. 397,297 filed Sept. 14, 1973 now U.S. Pat. No. 3,857,170 issued Dec. 31, 1974, and this inhibits misalignment between the shaft and bearings and also between the rotor and stator from arising during the assembly of dynamoelectric machine 1.

It may also be noted that disassembly of dynamoelectric machine 1 is facilitated since such may be effected merely by heating plugs 63 in sockets 15 until they melt.

Figure 10:
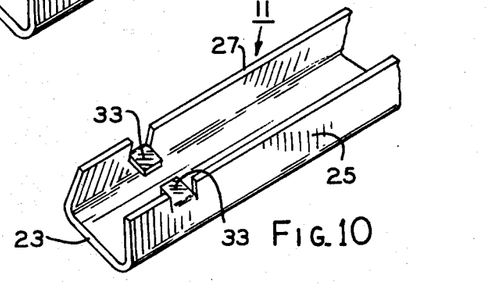
Figure 11:
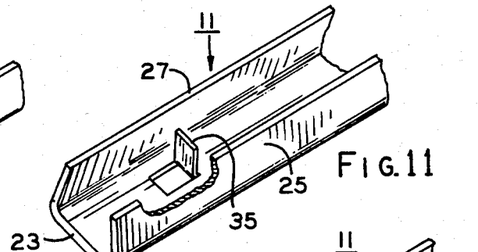

With respect to tabs 31, 33, 35 of beams 11, as shown in FIGS. 9–11, it may be noted that molten metal M within sockets 15 would, upon solidification, also shrink into tight gripping or shrinking engagement with the tabs generally in the same manner as discussed hereinbefore with respect to socket studs 45 and cross-member 47 thereby to positively retain the beams against displacement from sockets 15.

Figure 12:
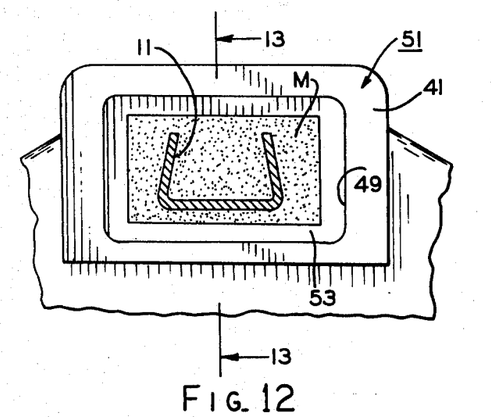
FIG. 12 illustrates an alternative receiving means for the supporting means of the dynamoelectric machine of FIG. 1.
Figure 13:
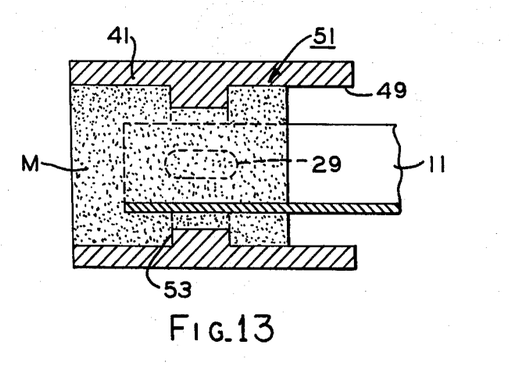
FIG. 13 is sectional view taken along line 13—13 of FIG. 12.
Figure 14:
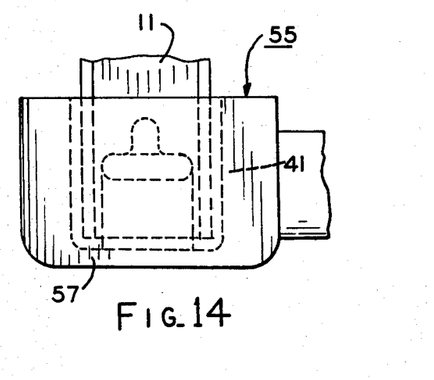
FIG. 14 illustrates another alternative receiving means for the supporting means of the dynamoelectric machine of FIG. 1.

In FIGS. 12 and 13, it may be noted that metal M, upon solidification, will also shrink into tight gripping or shrinking engagement with flange 53 integrally provided on side wall 41 of socket 51 generally in the same manner as described hereinbefore with respect to studs 45 of sockets 15; therefore, plugs 63, formed by metal M upon solidification thereof, establish a rigid connection in mounting engagement between beams 11 and flange 53 of socket 51.

It may also be noted that socket 55, FIG. 14, obviates the necessity of using pads 59 since integral lower end wall 57 closes the socket for the introduction of molten metal M thereinto. Metallic plug 63, formed upon solidification of molten metal M within socket 55, establishes a rigid connection in mounting engagement between beams 11 and socket 55.

From the foregoing, it is now apparent that a novel method of assembling dynamoelectric machine 1 is provided by way of illustration meeting all of the objects and advantageous features set out hereinabove, as well as others, noted in the specification and that changes may be made with respect to the particular compositions, arrangements, shapes and details of components utilized for practicing such methods, as well as variances in the steps of such methods, by those having ordinary skill in the art without departing from the spirit of the invention or the scope thereof, as set out in the claims which follow.

What I claim as new and desire to secure by Letters Patent of the United States is:

1. A method of assembling a dynamoelectric machine comprising the steps of:
   a. mounting a set of beams to a magnetic core with two spaced portions of each beam extending from opposite faces of the core, respectively;

b. positioning a rotor within the bore of the magnetic core with a rotor shaft journaled through a bearing of a first bearing carrying end shield;

c. positioning the set of beam portions extending from one of the opposite faces of the core within a set of sockets in the first bearing carrying end shield with an air gap existing between the inner walls of the sockets and the extending beam portions residing therewithin;

d. filling at least portions of the air gaps with molten metal;

e. solidifying the molten metal to form metallic plugs within the sockets in abutment with the inner socket walls and the extending beam portions residing therewithin;

f. positioning the set of beam portions extending from the other of the opposite faces of the core within a set of second sockets in a second bearing carrying end shield with air gaps existing between the inner walls of the second sockets and the extending beam portions residing therewithin, and with the rotor shaft journaled through the bearing of the second bearing carrying end shield;

g. filling at least portions of the air gaps within the second set of sockets with molten metal; and h. solidifying the molten metal in the second set of sockets in abutment with the second set of socket inner walls and the extending beam portions residing therebetween.

2. A method in accordance with claim 1 wherein the extending portions of the beams residing within the first and second sets of sockets each have an aperture which is filled with molten metal while portions of the air gaps therewith are filled, and wherein the molten metal in the beam apertures is solidified while the molten metal within the air gaps is soldified.

3. A method in accordance with claim 1 wherein at least a portion of each of the sockets is bifurcated by a socket stud projecting from an inner wall of the socket into the air gap therewithin, and wherein during the first filling step and the second filling step the air gap adjacent the socket stud is filled with molten metal, and wherein during the first solidifying step and the second solidifying step the molten metal adjacent the socket stud is solidified.

4. A method in accordance with claim 1 wherein at least a portion of each of the sockets is bifurcated by a socket stud projecting from an inner wall of the socket into the air gap therewithin and wherein during the first filling step and the second filling step the air gap about the socket stud is filled with molten metal and wherein during the first solidifying step and the second solidifying step the molten metal adjacent the socket stud is shrunk thereon.

5. In assembling a dynamoelectric machine a method of mounting a bearing carrying end shield to a magnetic core comprising the steps of: securing a plurality or rigid beams to the magnetic core with a portion of each beam extending from the core; positioning a rotor within the magnetic core with the rotor shaft journaled through a bearing carried by the end shield and with part of the extending portion of each beam positioned within a socket in the end shield; introducing molten metal into the sockets; and solidifying the molten metal.

6. The method of claim 5 wherein the beams are U-shaped in cross section, and wherein the molten metal is introduced into the sockets by pouring the molten metal into the U-shaped beams above the sockets and permitting the molten metal to flow downwardly within the U-shaped beams and into the sockets.

7. The method as set forth in claim 5 comprising the intermediate step of closing an end of the sockets prior to the introducing step.

8. The method of claim 5 wherein a portion of each socket is bifurcated by a socket stud projecting from an inenr socket wall, and wherein molten metal in introduced into the sockets to envelope the socket studs.

9. A method of mounting first and second bearing carrying end shields to a magnetic core member of a dynamoelectric machine comprising the steps of: securing a plurality of rigid beams to the magnetic core with portions of each beam extending from first and second core faces; positioning a rotor within the magnetic core with the rotor shaft journaled through the bearing of a first bearing carrying end shield positioned adjacent the first core face; securing the extending portions of the plurality or rigid beams to the first bearing carrying end shield by respectively positioning part of the extending portions of the plurality of beams within a plurality of sockets in the first bearing carrying end shield, introducing molten metal into the plurality of sockets, and solidifying the molten metal; and securing the second bearing carrying end shield to the plurality of beams with the rotor shaft journaled through the bearing of the second bearing carrying end shield.

10. A method of assembling a dynamoelectric machine having a stationary member, a rotatable member adapted to be rotatably received in the stationary member, and a pair of means for rotatably supporting the rotatable member within the stationary member comprising the steps of:

a. attaching to the stationary member a plurality of beams having opposite end portions extending from the stationary member, respectively;

b. mounting the rotatable member with the stationary member and the supporting members with at least one of the opposite end portions of the beams within means in at least one of the supporting means for receiving them;

c. filling at least partially the receiving means with molten metal and solidifying it for interconnecting the one opposite end portion of the beams with the one supporting means; and d. securing the other of the supporting means to the other of the opposite end portion of the beams.

11. The method as set forth in claim 10, wherein the filling and solidifying step includes shrinking of the metal upon its soldification for gripping engagement with at least some of the one opposite end portions and at least a portion of at least some of the receiving means.

12. The method as set forth in claim 10, wherein at least some of the one opposite end portions include means adapted to be at least partially enveloped by the metal thereby to prevent relative displacement of the beams and the one supporting means subsequent to the filling and solidifying step.

13. The method as set forth in claim 10, comprising the intermediate step of closing an end of the receiving means prior to the filling and solidifying step.

14. The method as set forth in claim 13, wherein the intermediate step further comprises engaging means for resisting heat with the one supporting means about the receiving means therein.

15. The method as set forth in claim 14, wherein the mounting step comprises spacing the one opposite end portion from the ends of the receiving means for preventing engagement of the one opposite end portion with the heat resisting means.

16. The method as set forth in claim 10, wherein the mounting step further comprises spacing the one opposite end portion from confronting side walls of the receiving means.

17. The method as set forth in claim 10, comprising the preliminary step of providing the one opposite end portion with means for engagement with the metal upon the soldifying thereof to prevent displacement of the one opposite end portion from the receiving means.

18. The method as set forth in claim 17, wherein the engagement means includes at least one aperture extending through the one opposite end portion, resepctively.

19. The method as set forth in claim 17, wherein the engagement means include means on the one opposite end portion and extending therefrom.

20. The method as set forth in claim 10, wherein the receiving means comprise sockets having side walls disposed in spaced relation with the one opposite end portion.

21. The method as set forth in claim 20, wherein the sockets include means integral with the side walls and extending generally away therefrom into the sockets for gripping engagement with the metal upon the solidifying thereof.

22. The method as set forth in claim 21, wherein the gripping means include a stud having one end connecting with the side wall and having a cross-member on a free end thereof within the socket.

23. The method as set forth in claim 10, wherein the attaching step further comprises staking the beams into displacement preventing engagement with means for containing them provided in the stationary member.

24. The method as set forth in claim 10, wherein the filling and solidifying step further comprises pouring the molten metal between gaps formed between the one opposite end portion and the receiving means thereby to provide metal plugs upon the solidifying of the metal in engagement between the one opposite end portion and the receiving means.

25. The method as set forth in claim 10, comprising the preliminary step of forming means in at least some of the one opposite end portions for accomodating the passage therethrough of molten metal during the filling and solidifying step.

26. The method as set forth in claim 10, wherein the beams are generally U-shaped in cross-section, and wherein the filling and solidifying step further comprises pouring the molten metal generally into the U-shaped section of the beams adjacent the entry thereof into the receiving means and flowing the molten metal downwardly within the U-shaped section of the beams into the receiving means.

27. A method of assembling a dynamoelectric machine having a stationary member, a rotatable member, and a pair of means for supporting the rotatable member with respect to the stationary member comprising the steps of:
  a. connecting to the stationary member a plurality of beams each having a pair of opposite end portions;
  b. assembling the rotatable member with the stationary member and at least one of the supporting means with one of the opposite end portions of each of the beams disposed within a generally open end of means integrally formed in the at least one supporting means for accepting the beam end portions; then
  c. providing a hardenable material in the accepting means and freely flowing it therein into interfacing relation with both the at least one supporting means and at least a part of the beam end portions within the accepting means; and then
  d. solidifying the hardenable material to form a generally solidified rigid tie between the supporting means and the beam end portions; and
  e. securing the other of the supporting means to the other of the opposite end portions of each of the beams.

28. The method as set forth in claim 27, wherein the hardenable material is generally constituted by a metal.

29. The method as set forth in claim 27, wherein the solidifying step includes shrinking the hardenable material into mechanical connection between the at least a part of the beam end portions and an associated portion of the supporting means thereby forming the generally solidified rigid tie.

30. The method as set forth in claim 27, wherein the providing and flowing step includes supplying at least a predetermined amount of the hardenable material in the accepting means.

31. The method as set forth in claim 27, comprising the intermediate step of closing an end opposite the open end of the accepting means prior to the providing and flowing step.

32. The method as set forth in claim 27, wherein the at least part of the beam end portions includes means for engagement with the hardenable material upon the forming of the generally solidified rigid tie thereby to generally prevent displacement of the beams from the at least one supporting means.

33. The method as set forth in claim 27, wherein the at least one supporting means includes means extending into the accepting means for engagement with the hardenable material upon the forming of the generally solidified rigid tie thereby to generally prevent displacement of the at least one supporting means from the beams.

34. The method as set forth in claim 27, comprising the additional step of securing other means for supporting the rotatable member to the other of the end portions of the at least one supporting means.

35. In the manufacture of a dynamoelectric machine, a method of assembling a structural component and a stationary member of the dynamoelectric machine comprising the steps of:
  a. attaching to the stationary member at least one generally elongate beam having an end portion extending from the stationary member;
  b. disposing a rotatable member for the dynamoelectric machine in the stationary member and the structural component and positioning the end portion within means in the structural component for generally encompassing at least a part of the end portion; and then
  c. providing in the encompassing means a hardenable material and freely flowing it therewithin into interfacing relation with both at least a part of the structural component and the at least part of the end portion; and d. solidifying the hardenable material to form a solidified connection between the structural component and the end portion.

36. The method as set forth in claim 35, wherein the hardenable material is generally constituted by metal.

37. The method as set forth in claim 35, wherein the solidifying step includes shrinking the hardenable material into mechanical interconnecting engagement with both the at least part of the supporting means and the at least part of the end portion thereby to form the generally solidified connection therebetween.

38. The method as set forth in claim 35, wherein the at least part of the structural component is generally constituted by means integral with the structural component and extending into the encompassing means for engagement with the hardenable material upon the forming of the generally solidified conenction thereby to generally prevent displacement of the structural component from the at least one beam.

39. The method as set forth in claim 35, wherein the at least part of the end portion includes means for engagement with the hardenable material upon the forming of the generally solidified connection to generally prevent displacement of the at least one beam from the structural component.

40. The method as set forth in claim 35, comprising the intermediate step of closing an end of the encompassing means prior to the providing and flowing step.

41. The method as set forth in claim 35, wherein the providing and flowing step includes supplying to the encompassing means at least a predetermined amount of the hardenable material.

42. The method as set forth in claim 35, comprising the additional step of associating another structural member with the rotatable member and the at least one beam at another portion thereof generally opposite to the first named end portion.

* * * * *

UNITED STATES PATENT OFFICE
CERTIFICATE OF CORRECTION

PATENT NO. : 3,961,416

DATED : June 8, 1976

INVENTOR(S) : Charles W. Otto

It is certified that error appears in the above-identified patent and that said Letters Patent are hereby corrected as shown below:

In the title, delete "DYANAMOELECTRIC" and insert --DYNAMOELECTRIC--.

Col. 3, line 54, delete "provide" and insert --provided--.
Col. 4, line 44, delete "exemplification" and insert --exemplifications--;
        line 68, after "ity" insert --of--.
Col. 5, line 36, delete "of" and insert --to--.
Col. 6, line 8, after "but" insert --it--;
        line 63, after "may" insert --be--.
Col. 7, line 40, delete "soldification" and insert --solidification--;
        line 64, delete "obejcts" and insert --objects--;
        line 64, delete "advantageuos" and insert --advantageous--;
        line 66, delete "positing" and insert --positioning--.
Col. 8, line 1, delete "applicataion" and insert --application--.
Col. 10, line 9, delete "inenr" and insert --inner--;
        line 52, delete "soldification" and insert --solidification--.
Col. 11, line 17, delete "resepc" and insert --respec--;
        line 48, delete "accomodating" and insert --accommodating--.
Col. 13, line 17, delete "conenction" and insert --connection--.

Signed and Sealed this

Ninth Day of November 1976

[SEAL]

Attest:

RUTH C. MASON
*Attesting Officer*

C. MARSHALL DANN
*Commissioner of Patents and Trademarks*